(12) United States Patent
Tew et al.

(10) Patent No.: US 6,883,543 B2
(45) Date of Patent: Apr. 26, 2005

(54) PULSE DETONATION ENGINE HAVING AN AERODYNAMIC VALVE

(75) Inventors: David E. Tew, New Britain, CT (US); Wendell V. Twelves, Jr., Manchester, CT (US)

(73) Assignee: United Technologies Corporation, Hartford, CT (US)

( * ) Notice: Subject to any disclaimer, the term of this patent is extended or adjusted under 35 U.S.C. 154(b) by 83 days.

(21) Appl. No.: 10/603,845

(22) Filed: Jun. 25, 2003

(65) Prior Publication Data

US 2004/0000134 A1 Jan. 1, 2004

Related U.S. Application Data

(62) Division of application No. 10/026,236, filed on Dec. 21, 2001, now Pat. No. 6,584,765.

(51) Int. Cl.$^7$ .................................................. F16K 3/00
(52) U.S. Cl. .............................. 137/624.13; 137/625.31
(58) Field of Search ....................... 137/624.13, 625.31, 137/454.6, 601.01, 601.05, 601.14, 601.16, 625.46

(56) References Cited

U.S. PATENT DOCUMENTS

| | | | |
|---|---|---|---|
| 3,175,357 A | | 3/1965 | Klein ......................... 60/39.02 |
| 3,937,252 A | * | 2/1976 | Ishida ..................... 137/624.13 |
| 4,953,595 A | * | 9/1990 | Kotlyar .................. 137/624.13 |
| 5,316,042 A | * | 5/1994 | Lim et al. ............... 137/625.11 |
| 5,345,758 A | | 9/1994 | Bussing ..................... 60/39.38 |
| 5,353,588 A | | 10/1994 | Richard ..................... 60/39.38 |
| 5,473,885 A | | 12/1995 | Hunter, Jr. et al. ........... 60/204 |
| 5,513,489 A | | 5/1996 | Bussing ..................... 60/39.38 |
| 5,557,926 A | | 9/1996 | Hunter, Jr. et al. ........... 60/247 |
| 5,901,550 A | | 5/1999 | Bussing et al. ............. 60/39.38 |
| 5,913,329 A | * | 6/1999 | Haynes et al. .......... 137/624.13 |

* cited by examiner

*Primary Examiner*—Kevin Lee

(57) ABSTRACT

A pulse detonation engine (10) is provided with an aerovalve (14) for controlling the pressure of injected propellants (Ox, Fuel) in an open-ended detonation chamber (26). The propellants are injected at such pressure and velocity, and in a direction generally toward a forward thrust wall end (16) of the detonation chamber (26), an aerovalve (14) is formed which effectively inhibits or prevents egress of the propellant from the detonation chamber (26). A shock wave (34) formed by the injected propellant acts, after reflection by the thrust wall end (16) and in combination with the aerovalve (14), to compress and conserve, or increase, the pressure of the injected propellant. Carefully timed ignition (28) effects a detonation pulse under desired conditions of maintained, or increased, pressure. Termination of the propellant injection serves to "open" the aerovalve (14), and exhaust of the combusted propellants occurs to produce thrust. Alternate embodiments of propellant injection mechanisms (12, 112) provide pulse valves (24, 122, 124) each having a fixed slotted disk (40, 140, 240) and a rotating slotted disk (42, 142, 242) to provide the desired high speed valving of discrete pulses of propellant for injection.

9 Claims, 8 Drawing Sheets

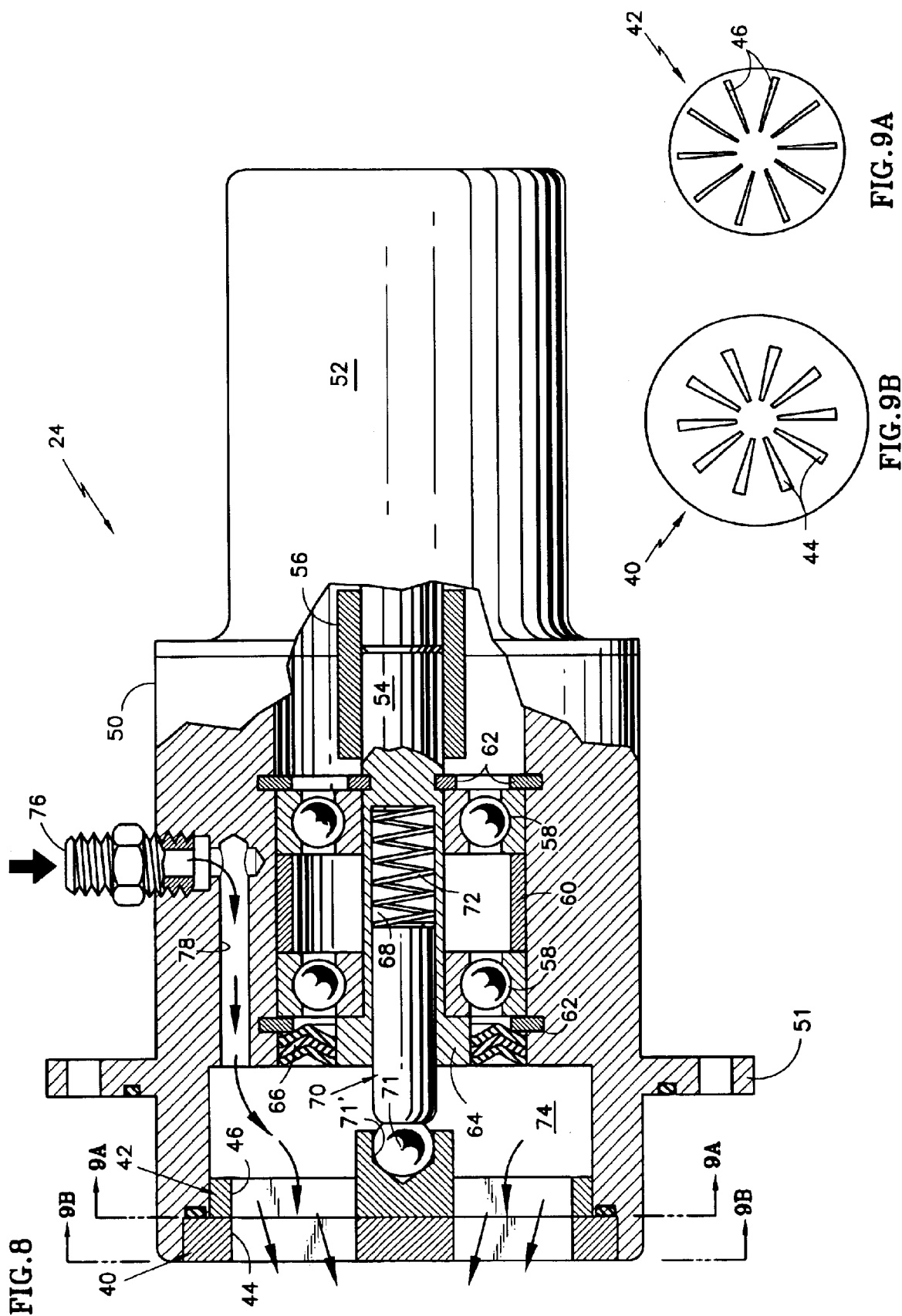

PULSE DETONATION ENGINE HAVING AN AERODYNAMIC VALVE

This application is a division of U.S. patent application Ser. No. 10/026,236, filed Dec. 21, 2001 now U.S. Pat. No. 6,584,765 and incorporated herein by reference.

This invention was made with United States Government support under Contract Number NAS8-98-035 awarded by the National Aeronautics and Space Administration. The Government has certain rights in this invention.

TECHNICAL FIELD

This invention relates generally to pulse detonation engines, and more particularly to the fluid dynamics of such engines. More particularly still, the invention relates to the valving of fluids employed in pulse detonation engines.

BACKGROUND ART

Pulse detonation engines (PDE) represent an energy conversion device that has existed for some time, but which have recently received increased attention. Such engines generally combust fuel and an oxidant in a chamber, or combustor, to provide a component of thrust or force in an intended direction. The combustion occurs in the manner of discrete, i. e. pulsed, detonations. The present invention is concerned with configurations that employ an open-ended chamber, such as a rocket nozzle, that may be employed for a component of thrust. A principal application for such engines is as a thrust source to propel an aerospace vehicle in the atmosphere or the vacuum of space. In such instance, the PDE is also a rocket engine.

The development of PDE's requires the ability to quickly fill an open-ended chamber with a detonatable mixture while purging the exiting exhaust gases with minimal mixing. For pulse detonation rocket engine applications where the open end of the chamber is likely to be exposed to a vacuum, the fresh charge of detonatable mixture must be contained in the chamber for several milliseconds before the detonation is initiated. Further, the mixture must be pressurized to levels on the order of 50–1000 psi with the chamber open to vacuum in order to generate thrust competitive with conventional rocket engines. Moreover, the process must be done at rates approaching or exceeding 100 Hz.

Two alternative concepts that may be used to control chamber pressure are mechanical valves and fixed throats, but each has significant limitations. The complexity and weight of a mechanical valve, combined with durability and sealing requirements in the hot exhaust flow, suggest that it would be difficult and/or impractical to implement in this application and environment. A fixed throat near the chamber exit would restrict the flow, allowing the chamber to be pressurized with high propellant flow rates while some propellant is lost through the exit. This arrangement suffers from the loss of efficiency due to propellant leakage during the fill process and from thrust reduction due to the reduced exit area of the throat.

A further discussion of the physics and operation of PDE's is contained in several U.S. Patents by T. R. Bussing, including U.S. Pat. Nos. 5,513,489; 5,353,588; and 5,345,758. These patents discuss the use of a rotary valve, but only to control the admission of propellant and oxidant to each of multiple combustor chambers rather than to also control the pressure developed in the chamber. They rely upon an approach that uses multiple chambers each feeding into a common, restricted throat.

Accordingly, it is an object of the invention to provide an arrangement that is durable, relatively efficient, and simple, for controlling the pressure of fluids, such as propellants, in the chamber of a pulse detonation engine.

It is a further object to provide a pulse detonation engine in which the timing of detonation is optimized or tuned in accordance with the present invention.

It is a still further object to provide improved fluid injection mechanism for use with the pulse detonation engine in accordance with the invention.

DISCLOSURE OF INVENTION

A pulse detonation engine (PDE) is provided with an aerodynamic valve (aerovalve) for controlling the pressure of injected fluids, typically gases, but also including liquids, such as fuel or fuel and oxidizer, referred to as propellants, in an open-ended detonation chamber. The PDE includes a detonation chamber closed at a thrust wall end and open at the opposite, exhaust, end. A fluid injection mechanism injects pressurized propellant fluid into and directed toward the thrust wall end of, the detonation chamber. The propellant fluid is injected in a pulsed manner by the injection mechanism, and with sufficient pressure and velocity and such direction as to effectively restrict or prevent rearward flow of the injected fluid, thus forming a closed aerovalve. Moreover, the injected propellant fluid establishes a shock wave which, when moving rearward in the detonation chamber toward the exhaust end after reflection by the thrust wall end, serves in combination with the closed aerovalve to increase, or at least sufficiently conserve, the pressure of the fluid in the chamber, such that it is a pressure preferably greater than, or at least nearly as great as, that at which it entered. At the appropriate instant, the injected and pressurized propellant is detonated, as by an ignition device, to rapidly combust the injected propellants. Because the exhaust end of the detonation chamber is not mechanically constricted, as by a mechanical valve, and the aerovalve is open because injection has ceased, the resulting combustion products readily exit to produce thrust. Such configuration avoids the concerns of a mechanical valve structure for controlling exhaust from the detonation chamber and does not require a mechanically-constricted throat structure which would otherwise impede exhaust flow.

The PDE is preferably tuned to optimize the specific impulse or thrust. This is accomplished by coupling the timing of the fluid propellant injection and the subsequent ignition to maximize performance. More specifically, the mass average chamber temperature and pressure are at a maximum as the reflected shock wave nears the injection mechanism. The ignition is timed and positioned such that the resulting detonation wave, which moves at a velocity greater than the reflected shock wave, arrives at the injection mechanism at the same instant as the reflected shock wave.

The propellant injection mechanism is a high frequency pulse valve which delivers and injects pressurized pulses of propellant, typically fuel and oxidizer, to the detonation chamber of the PDE. Various arrangements may be used for providing such pressurized pulses of propellant. However, in the propellant injection mechanism of the preferred embodiment, each propellant component is supplied, at pressure, to a respective slotted disk type of valve. The slotted disk valve includes at least one rotating disk having a plurality of slots, and a complementary slotted disk, typically stationary, such that the slots of the two disks port (open) and unport (close) in rapid succession.

The propellant pulses are delivered from the disk valves to the detonation chamber via injection ducts which are positioned and directed to provide the aerovalve of the invention.

One embodiment of the propellant injection mechanism comprises one or more injection valves offset from the axis of the detonation chamber and in which the rotating disk is driven by a spring-biased drive member at the axis of the disk, but offset from the detonation chamber axis.

Another embodiment of the propellant injection mechanism comprises a pair of annular injection valves that encircle the detonation chamber and in which annular fixed and rotating slotted disks are disposed coaxially with the detonation chamber to provide the pulsed injections.

The foregoing features and advantages of the present invention will become more apparent in light of the following detailed description of exemplary embodiments thereof as illustrated in the accompanying drawings.

BRIEF DESCRIPTION OF DRAWINGS

FIG. 8 is a sectional view of one embodiment of a slotted-disk pulse valve for metering and injecting propellant fluid to the PDE chamber to provide the aerovalve in accordance with the invention;

FIGS. 9A and 9B depict, respectively, the rotating disk and the stationary disk of the pulse valve of FIG. 8;

BEST MODE FOR CARRYING OUT THE INVENTION

Figure 1:
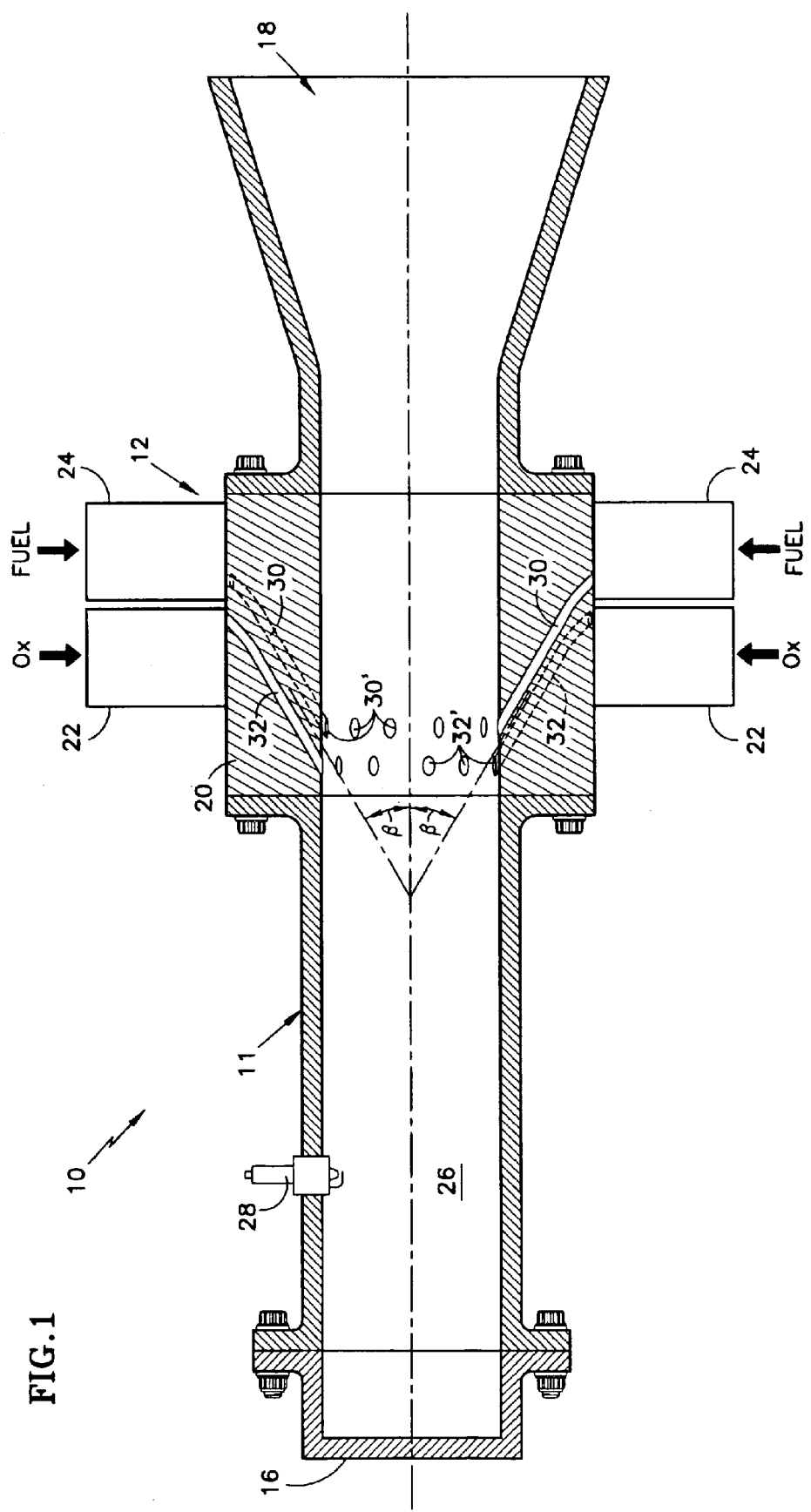
FIG. 1 is a simplified, cross-sectional view of a pulse detonation engine (PDE) employing an aerodynamic valve (aerovalve) in accordance with the invention.
Figure 2A:
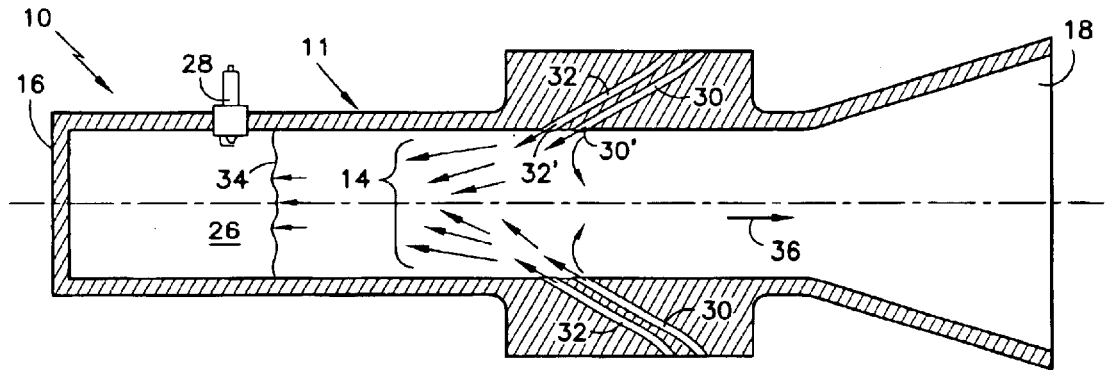
FIGS. 2A, 2B and 2C are simplified diagrammatical depictions of the PDE of FIG. 1 showing, respectively, initial injection of propellant fluid to establish and close an aerovalve and also create a shock wave, detonation of propellant fluid at appropriate timing of the reflected shock wave, and final exhaust and venting of combusted propellant fluid through relaxed, or opened, aerovalve.
Figure 2B:
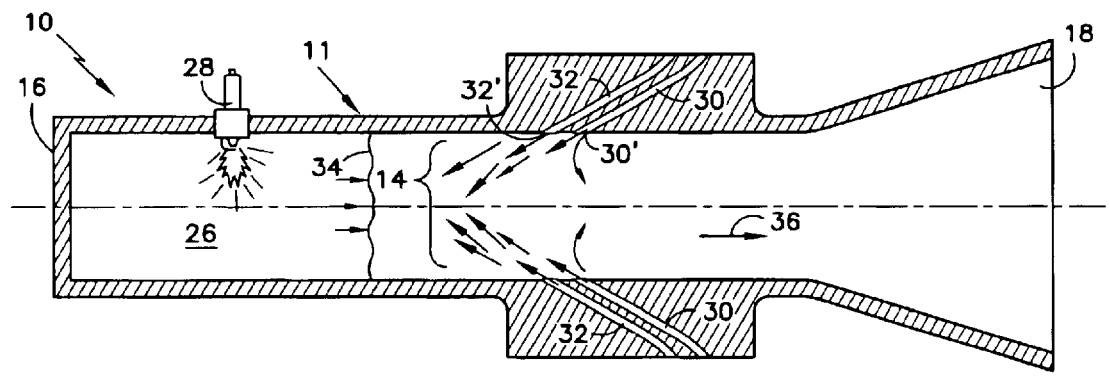
Figure 2C:
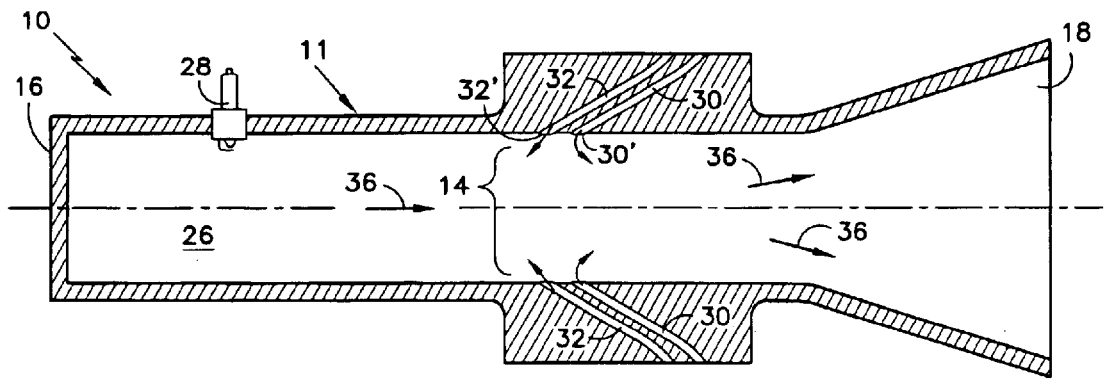

Referring to FIGS. 1 and 2A–2C, there is illustrated in FIG. 1 a simplified, somewhat diagrammatic, cross-sectional view of a pulse detonation engine (PDE) 10 employing fluid injection mechanism 12 to provide the aerodynamic valve (aerovalve) 14 depicted diagrammatically through the use of gas flow arrows in FIGS. 2A–2C in accordance with the invention. The PDE 10 is typically an elongate tubular structure 11 having a closed thrust wall end 16 and an opposite exit, or exhaust, end 18 that is open. A fluid injection mechanism 12 is located intermediate the opposite ends 16 and 18, relatively toward the exhaust end 18, and may typically include an annular injector member 20 and associated fluid pulse injection valves 22 and 24. The annular injector member 20 may conveniently be included as a structural portion of the tubular PDE structure. The region of the PDE between the injector member 20 and the thrust wall end 16 comprises the detonation, or combustion, chamber 26. An active ignition source, such as spark plug 28, is located in a wall of the PDE in communication with the detonation chamber 26.

The PDE 10 is provided with a supply of fuel, such as hydrogen gas or liquid, via the fluid pulse injection valve 24, and with a supply of oxidizer, such as oxygen gas or liquid, via the fluid pulse injection valve 22. The fuel and the oxidizer, in liquid or gas phase, are injected into the detonation chamber 26 via fuel injection ducts 30 and oxidizer injection ducts 32, respectively, in the annular injector member 20. The inner ends of the ducts 30 and 32 define respective fuel injection ports 30' and oxidizer injection ports 32' at their interface with the detonation chamber 26. The fuel injection ducts 30 and the oxidizer injection ducts 32 are oriented such that, at least at their respective ports 30' and 32', they form an angle $\beta$ with the axis, or centerline, of the detonation chamber 26 and the tubular structure 11 of the PDE 10. This orientation is selected so as to inject the fuel and oxidizer relatively forward toward the thrust wall end 16 of the PDE 10. In this way, the advantages of the aerovalve 14 of the invention are obtained, as will be explained in greater detail. Although the fuel injection ducts 30 and the fuel injection ports 30' are depicted in FIG. 1 as being displaced longitudinally slightly from the oxidant injection ducts 32 and the oxidant injection ports 32' for convenience of illustration, it will be appreciated that they may also be at substantially the same longitudinal position, as will become evident later herein. In that latter instance, they may collectively appear as a single, nominally continuous, annular entry port.

Referring to the diagrammatical illustrations of FIGS. 2A–2C, there is depicted a cycle of operation of the PDE 10, including the associated aerovalve 14. FIG. 2A shows the fuel and oxidizer propellants being injected into the detonation chamber 26 under high pressure and speed via ducts 30 and 32 respectively. Assuming the PDE 10 is operating at high altitude or in space, the initial pressure in the detonation chamber 26 may be at a near-vacuum condition. The propellant flow expands as it is injected toward the thrust wall end 16. A shock wave 34 is formed at the leading edge of the advancing propellant flow. Importantly also, the high velocity of the flow toward the thrust wall end 16 limits its ability to turn toward the exhaust end 18 and leakage, represented by arrows 36, is thereby minimized or prevented. This latter characteristic results in the formation and relative closing of an aerodynamic valve, identified by the independent reference numeral 14, and thus aids in containing and compressing the injected propellants. Referring to FIGS. 2A and 2B, when the supersonic flow of the shock wave 34 contacts the thrust wall end 16, it is reflected back through the detonation chamber 26 toward the injection region and the exhaust end 18. This reflected shock wave 34 travels back over the injected propellant gas, both stagnating and heating the gas, as well as recovering pressure. The resulting pressure in detonation chamber 26 is seen to increase significantly, as will later be illustrated graphically. At the appropriate instant, the compressed and heated propellant gas is detonated, as by the firing of the spark plug 28 represented in FIG. 2B. The resulting detonation also produces a detonation wave front (not separately shown) which advances in all directions from its source at a velocity greater than the reflected shock wave 34. The timing of ignition and resulting detonation are preferably selected such that the reflected shock wave 34 and the detonation wave front arrive at the region of the injector ducts 30 and 32 at substantially the same time, at which time the mass average pressure and temperature in detonation chamber 26 are a maximum.

Referring to FIG. 2C, the PDE 10 is illustrated shortly after the detonation of FIG. 2B has occurred. It will be noted that because there is no further injection of fuel and oxidant, the aerovalve 14 has relatively opened or relaxed, to permit the rapid and thorough egress of the combusted propellants and the associated development of the desired thrust impulse. Following the opening of the aerovalve 14 and the exhaust of the combusted propellants, the PDE 10 is ready to begin a new pulse cycle by receiving a new injection of propellant, as depicted in FIG. 2A. In the interest of maximizing the cycle-average thrust, it is desirable to both fill, and later exhaust, the detonation chamber 26 as rapidly as possible. Cycle rates of 100 Hz are typical, resulting in cycle times of about 10 ms. It should be noted that cycle rates vary inversely as a function of the length of the detonation chamber 26 and thus, may be controlled and varied to some extent by the selection of the length of the detonation chamber 26. A further understanding of the invention is obtained with reference to the graphical depictions of FIGS. 3 and 4, which represent data obtained from an instrumented PDE 10 during a cycle of operation, but without ignition or detonation. The pulse detonation chamber 26 was cylindrical, having a diameter of about 4 inches and a length of about 40 inches, with the injection mechanism 12, and particularly the injection ducts 30 and 32, being located at the aft end of the detonation chamber, just forward of the exhaust end 18 of the PDE 10. The operating environment at the exhaust end 18 of PDE 10 was at a pressure less than 1 psia.

Figure 3:
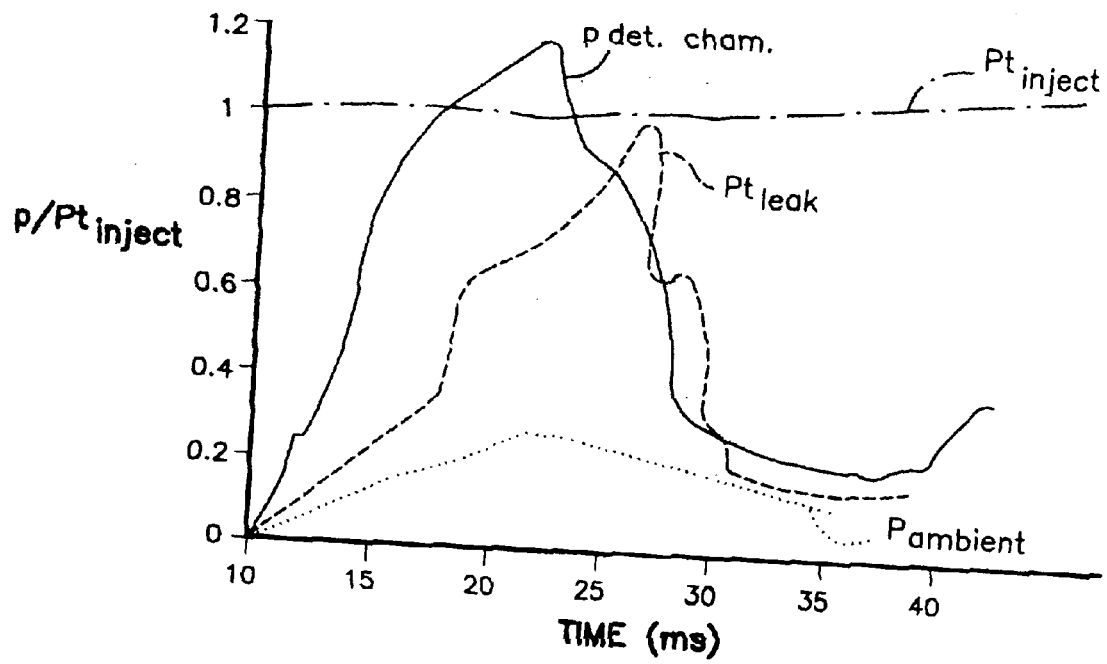
FIG. 3 is a graphical depiction of the filtered and normalized pressure histories at various locations in the PDE during a representative cycle of pulse operation, but omitting actual detonation.

Referring to FIG. 3, the normalized value of pressure, $P/Pt_{inject}$, for each of several locations at, or in, the PDE 10, is plotted as a function of Time (in milliseconds). In the expression for the normalized value of pressure, p is static pressure and $Pt_{inject}$ represents the injected total pressure. It will be seen that, as would be expected, the injection pressure, $Pt_{inject}$, at the injection ports 30' and 32' is substantially at unity. However, the pressure within the detonation chamber 26 is seen to experience a rapid increase from near zero to a maximum that is, in accordance with the invention, greater than the injected pressure, in this instance about 1.15, or 15% greater. The lowermost trace is representative of the ambient pressure at or near the exhaust end 18 of the PDE 10, and is indicative of a low, near-vacuum pressure except immediately following exhaust of the injected propellants. The remaining trace is that of $Pt_{leak}$, which is commensurate with the pressure of the leakage flow from the aerovalve 14, represented by the leakage arrows 36 of FIGS. 2A–2c.

Figure 4:
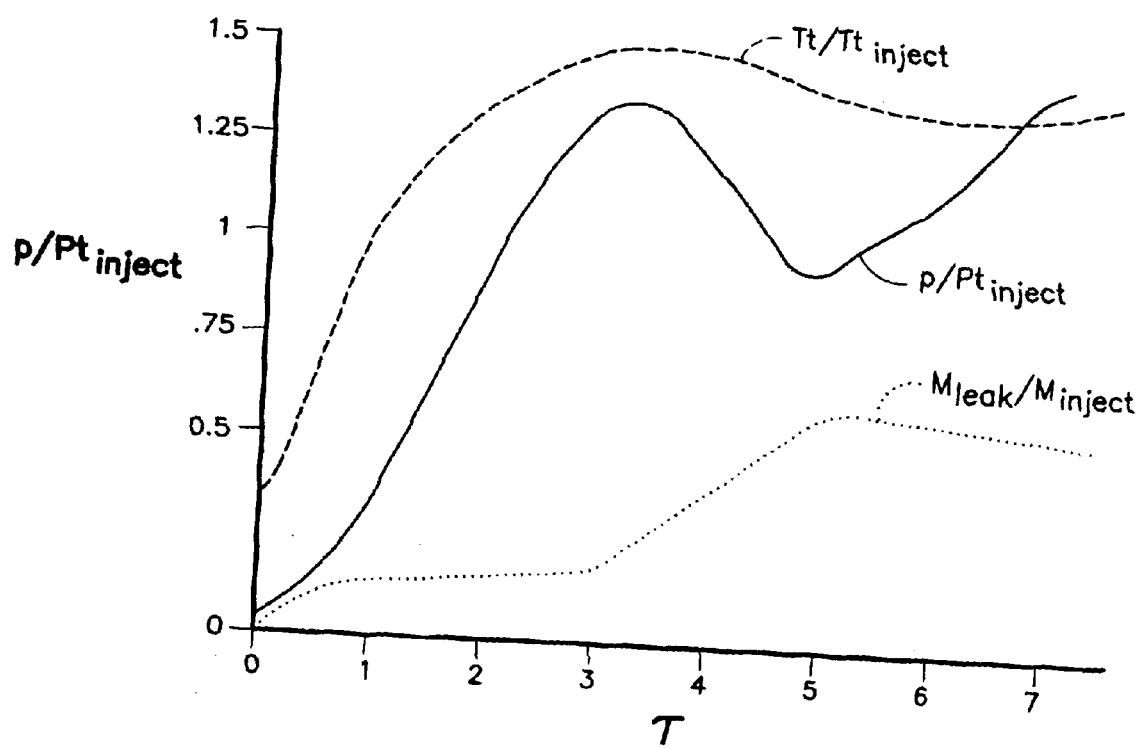
FIG. 4 is a graphical depiction of the chamber pressure, temperature and leakage during a representative cycle of pulse operation, but omitting actual detonation.

Referring to FIG. 4, the pressure, temperature, and leakage in detonation chamber 26 are displayed in a normalized form for one fill and exhaust cycle. The time base $\tau$ is normalized time, and represents $ta/l_c$, where "t" is time, "a" is the speed of sound and "$l_c$" is the length of detonation chamber 26 as measured between the injection ports 30'/32' and the thrust end wall 16. The values along the ordinate are normalized and dimensionless. The normalized value of the pressure of the injected propellants is seen to increase until about $\tau=2.75$, at which time it is about 1.2. or 20% greater than the injected pressure, $Pt_{inject}$, which in turn is typically about 50 times greater than the ambient pressure. Similarly, the temperature in the chamber 26 increases until about $\tau=2.75$, at which time it is about 1.3, or 30% greater than the temperature at the moment of initial injection. At, or shortly before, $\tau=2.75$, detonation would normally occur, however detonation is omitted in this example and the pressure is seen to drop rapidly, with the temperature also dropping at a lesser rate. Further, the leakage of fluids, initially undetonated injectant, is seen to be relatively low until about $\tau=2.75$, being only about 0.15, or 15%. Thereafter, the leakage of previously infected gases increases rapidly because further injection has terminated and the aerovalve 14 relaxes, or opens. Had detonation occurred, the combusted gases would rapidly exit the detonation chamber 26 as they produce thrust. In the foregoing example, the fuel and oxidant were injected at an angle, $\beta$, of 30°.

Figure 5:
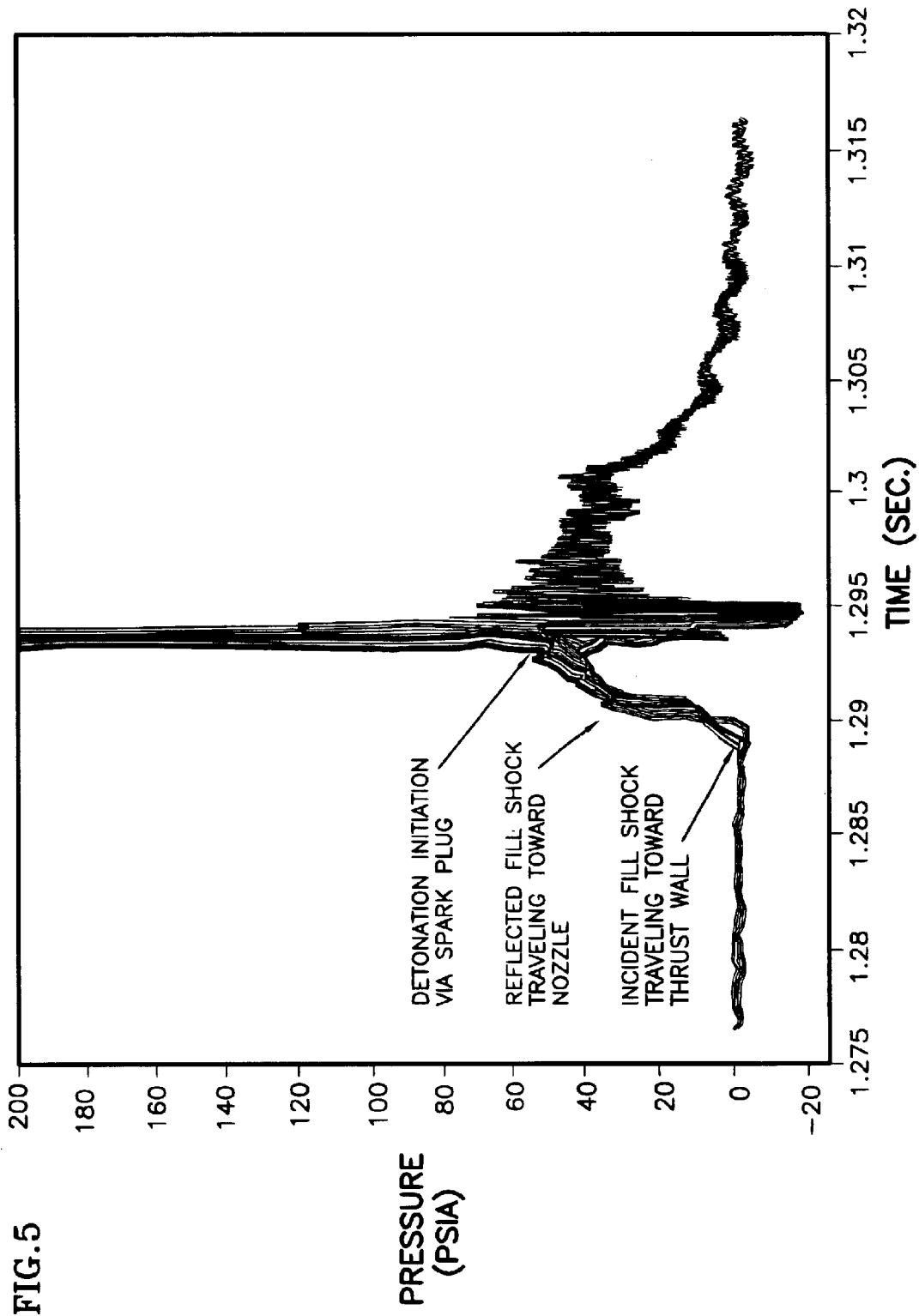
FIG. 5 is a graphical depiction of a single pulse pressure trace from multiple repetitive detonations.

Referring to FIG. 5, there is provided a graphical depiction of a single pulse pressure trace from a 25 Hz run with repetitive detonations. The initiation of fuel injection is seen at the left side origin of the trace and the normalized pressure remains relatively constant for a little longer than 1 ms as the shock wave 34 travels toward the thrust wall end 16. Then, at T=1.29 on the graph scale, the shock wave is reflected and the pressure in the detonation chamber 26 rapidly and significantly increases until, at about T=1.294, detonation occurs and the pressure increases very rapidly and very significantly. Shortly thereafter, the combustion products exhaust and produce the desired thrust, as indicated by the rapid decline in pressure between the detonation and initiation of the next injection of propellant about 2 ms later.

Figure 6:
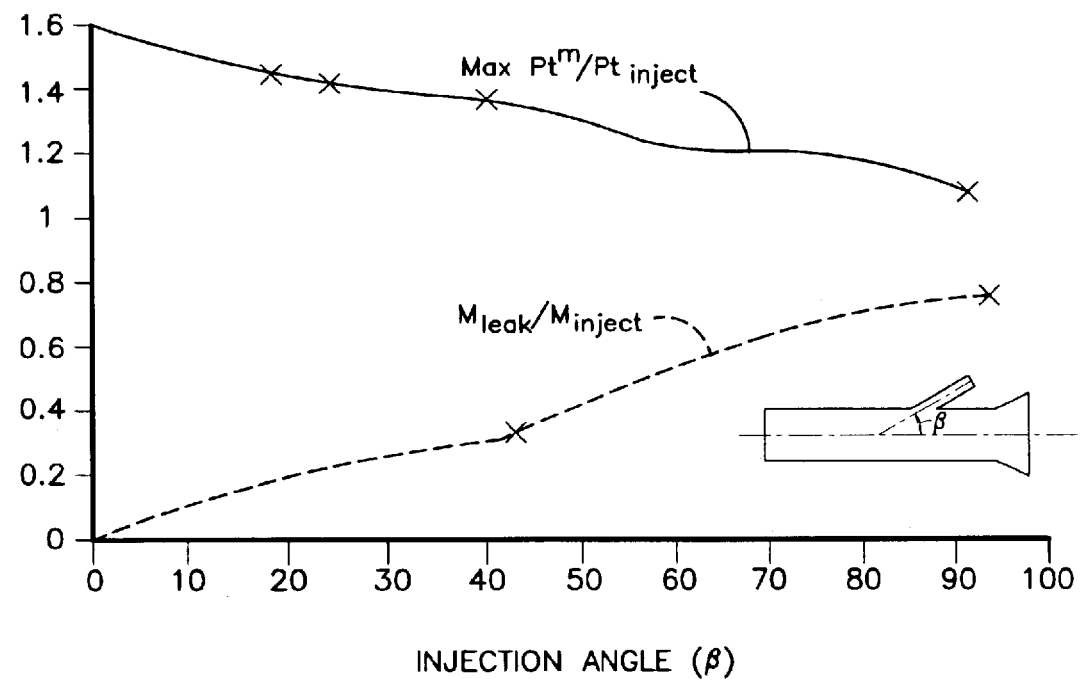
FIG. 6 is a graphical plot of the aerovalve performance metrics of pressure and leakage as a function of the injection angle ($\beta$) of the propellant fluid.

Referring to FIG. 6, the aerovalve performance metrics of pressure and leakage are displayed as a function of the injection angle $\beta$ of the propellant fluid. The ordinate represents normalized values for the performance of aerovalve 14 for the various injection angles $\beta$ measured along the abscissa. The maximum normalized mass-average total pressure per fill cycle is Max $Pt^m/Pt_{inject}$, where $Pt^m$ is the chamber mass-average total pressure and $Pt_{inject}$ is the injected total pressure. This parameter is important because the total impulse imparted to the system during a detonation blowdown is directly proportional to the post-detonation mass-average total pressure; the higher the fill pressure, the higher the post-detonation pressure. It will be noted that the normalized mass-average total pressure is greatest when the injection angle $\beta$ is smallest, as when $\beta$ is 0°. In that instance, the propellant would be directed parallel to the axis of detonation chamber 26 in the direction of the thrust wall end 16, and the maximum could theoretically be 60% greater than the injected pressure. Conversely, if the propellant is injected at an angle $\beta$ of 90° to the chamber's axis, there is essentially no increase in the pressure over the injected pressure. This analysis indicates the desirability of making the injection angle $\beta$ as small as possible in order to maximize the pressure increase. It will be appreciated, however, that the mechanics of injecting propellant at an angle of 0° may be difficult or impractical in an operating configuration, and angles in the range of about 20° to 45° are practicably obtainable and are seen to provide significant pressure increases, as for instance 50% and 25%, respectively. Further, the leakage parameter $M_{leak}/M_{inject}$ is a ratio of the mass of propellant gas leaked to the mass injected during fill. It will be seen that such leakage is less for a small injection angle $\beta$, and is significantly greater as the angle increases toward 90°. It is thus again desirable to keep the injection angle β as small as practicably possible. In the foregoing analysis, the pressure of the injected propellant, $Pt_{inject}$, is 50 times greater than the ambient pressure, and the ratio of the area of the injector ports 30'/32' is the same as the cross-sectional area of the detonation chamber 26.

Figure 7:
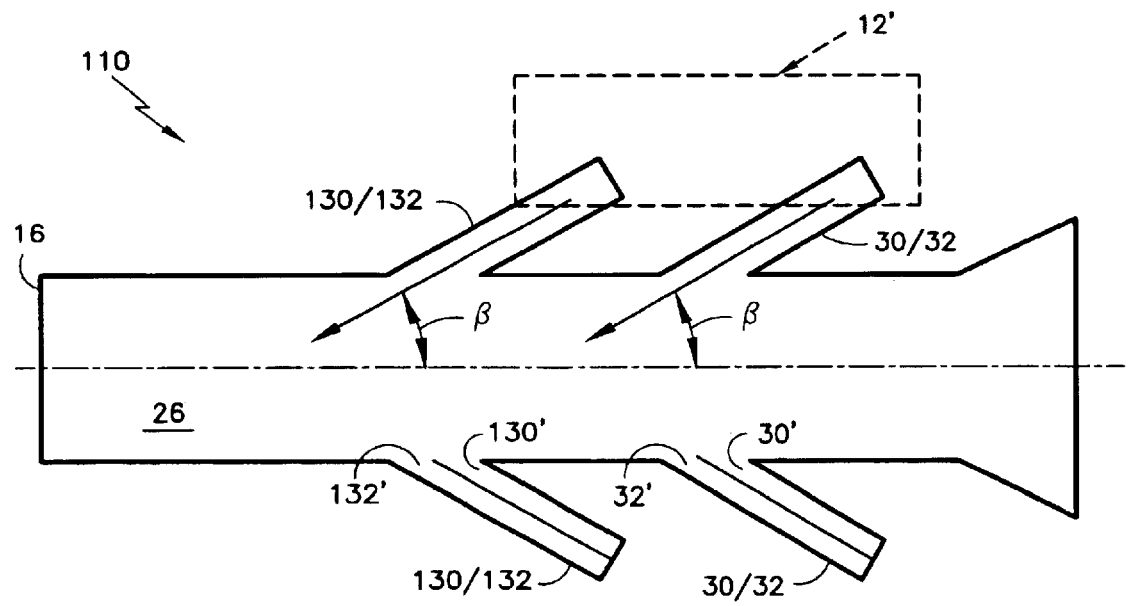
FIG. 7 is a simplified diagrammatical depiction of a PDE in accordance with the invention, illustrating multiple axially-spaced stations for the injection of propellant fluid.

A further variable that may be introduced to affect performance of the PDE is the addition of a second propellant injector, or a second set of propellant injectors, as part of the fluid injection mechanism 12' (shown in broken line), at a location intermediate the initial injector, or injector set, 30/32, and the thrust wall end 16. In the embodiment depicted in a simplified diagrammatic form in FIG. 7, the initial injector ducts 30/32, depicted for simplicity as a single duct, are at, or near, one end of detonation chamber 26 of a PDE 110 and the thrust wall end 16 is at the opposite end. The second set of injectors is represented by injector ducts 130/132 and respective ports 130'/132', which are located approximately midway between the initial injector ducts 30/32 and the thrust wall end 16. Such arrangement provides for the injection of propellants from the two locations at substantially the same time, which has been seen to result in a substantially faster filling rate and with substantially less leakage by the aerovalve 14. Under similar conditions and differing only in the number of injector sets, the single injector set configuration was seen to have a relative leakage value of 0.14 and fill time value of 2.94, whereas those same values for the two injector set configuration are 0.10 and 1.51, respectively. The advantages of including a second injector set are tempered by added complexity and slightly decreased pressure and temperature values, the latter believed being due to interference between the reflected shock wave from the added injector set and the advancing shock wave from the initial injector set. Also, as mentioned previously, some further advantage is derived if the injection angle β is kept relatively small, as for instance 45° or less, and preferably about 30°.

Attention is now given to a detailed consideration of one embodiment of a representative propellant injection valve, such as the fluid pulse injection valve (PIV) 24 for injecting fuel, such as hydrogen liquid or gas. Referring to FIGS. 8, 9A and 9B, there is illustrated a slotted-disk pulse injection valve 24, including the fixed disk 40 and rotating disk 42 which form parts thereof. The PIV 24 is designed to start and stop the flow of fluids, such as liquids or particularly gases, at high frequencies, without the shortcomings of prior devices that were frequency limited. The PIV 24 employs two circular disks, one being a fixed disk 40 and the other being a rotating disk 42. The faces of the disks 40 and 42 are ground to precision flatness and surface finish. The disks 40 and 42, respectively, have radial slots 44 and 46, respectively, cut into their faces such that when they are in facing mated engagement and rotated on a concentric axis, the slots 44 and 46 port (open) and unport (close). The frequency of the porting and unporting action is a function of the number of radial slots 44/46 in the faces of disks 40 and 42 and the relative rotational speed of those disks. Because the number of slots 44/46 can be relatively large, i. e., 10 to 20, high frequency operation can be achieved at relatively low rotational speeds. The angular extent of the slots 44/46 is typically constant from the radially innermost to the radially outermost portion of a respective slot, though the angular extent of the slots 44 may differ somewhat from that of slots 36. In either event, the angular extents are typically less than about 5°–10° and there may be, for example, 10 to 20 such slots per disk. In the instance of 20 slots, a frequency of 100 Hz is obtained at a rotational speed of 300 rpm. The faying surfaces between the rotating disk 42 and the stationary disk 40 are coated with a dry film lubricant compatible with the fluid being injected, to facilitate relative motion and sealing. Depending on the relative positioning of the disks 40 and 42, that face of the disk closest to the ducts 30/32 and the detonation chamber 26 (seen in FIG. 1) may be protected with a thermal barrier coating to minimize distortion from thermal gradients and transients. Further protection may be obtained by recessing the valve from the detonation flow path, as by ducts 30/32 and/or supplying a bleed fluid such as air, if available, over the sensitive surface.

Referring to the PIV 24 in greater detail, a housing 50 provides structural support for the PIV assembly, and includes mounting flanges 51 for mounting it in fixed relation to the structure 11 of the PDE 10. The housing 50 includes a generally cylindrical through-bore and coaxial counter bores. An electric motor 52 or similar actuator for providing rotary motion, is mounted to the outboard end of the PIV housing 50, and a rotary drive shaft 54 is connected thereto by a suitable coupling 56 for transmitting rotary torque and motion from the motor 52 to the drive shaft 54. The drive shaft 54 extends forwardly into the bore in housing 50 in radially-spaced relation, and is centered and rotatably supported therein by bearings 58. The bearings 58 are axially spaced from one another by spacer 60, and are retained at their ends against axial movement by snap rings 62 seated in the housing 50, and possibly additional snap rings in the shaft 54. The outside diameter of the drive shaft 54 is increased in a step at its inboard end to create a shoulder portion 64 against which the forward bearing 58 may axially bear and against which the inner diameter of a seal 66 may radially bear. The drive shaft 54 contains an axially-extending, blind, hexagonally-shaped (hex) recess 68 formed, as by machining, in its forward, or inboard, end for receiving a ball hex driver 70 in axially-sliding relationship therein. The shank of ball hex driver 70 is formed in a complementary hex shape with the recess 68 in the drive shaft 54 to prevent relative rotation there between. Of course other complementary geometries containing flats to prevent rotation would also suffice. The ball hex driver 70 has a ball hex driver head 71 formed at its forward, distal or inboard, end for driving engagement with the rotating disk 42 via a hex shaped recess 71' centered in the disk 42. A compression spring 72 is seated in the recess 68 in drive shaft 54, and acts against the rearward, proximal or outboard, end of the ball hex driver 70 to urge it forward and into engagement with the rotating disk 42, as will be described.

The forward, or inboard, end of the PIV housing 50 includes a relatively large counterbored region forming a plenum 74. A fitting 76 on housing 50 serves to admit propellant, in this instance fuel, to the plenum 74 via a conduit 78 in the housing. The rearward end of the plenum is closed by the seal 66, which extends radially from the shoulder 64 on drive shaft 54 to the radially inner wall of housing 50. The disks 40 and 42 are mounted in the forward end of PIV housing 50 such that they define the forward end of the plenum 74. The fixed disk 40 is axially forwardmost in housing 50, and is statically mounted therein in a sealed manner that prevents motion relative to the housing, axially, circumferentially, and radially, as by weld, braze, thread, or the like, or by machining. The faying surface of fixed disk faces rearwardly. The rotating disk 42 is positioned immediately rearward of the fixed disk 40, with the former's faying surface facing forward in opposition to that of the latter. The rotating disk 42 is free to rotate when driven by the ball hex driver 70. The ball hex driver head 71 is urged forward by compression spring 72, into mated driving engagement with the rotating disk 42 in, and via, the hex shaped recess 71' in the disk. This coupling and driving arrangement compensates for fore and aft angular misalignment (wobble) between fixed disk 40 and rotating disk 42 by allowing the faying surfaces of the disks to float with limited axial and wobble displacement and thereby maintain intimate contact during rotation. In addition to the nominal preload that the compression spring 72 provides, the propellant pressure in the plenum 74 applies a force load to the rotating disk 42 to maintain sealing contact between it and the fixed disk 40. The forward end of plenum 74 is sequentially opened and closed by means of the slots 44 and 46 in disks 40 and 42, respectively, thus successively porting and unporting. In this way, propellent admitted to the plenum 74 under pressure is discharged (injected) to the detonation chamber 26 as discrete, high frequency, pressurized pulses for providing the benefits attainable with such operation.

Figure 10:
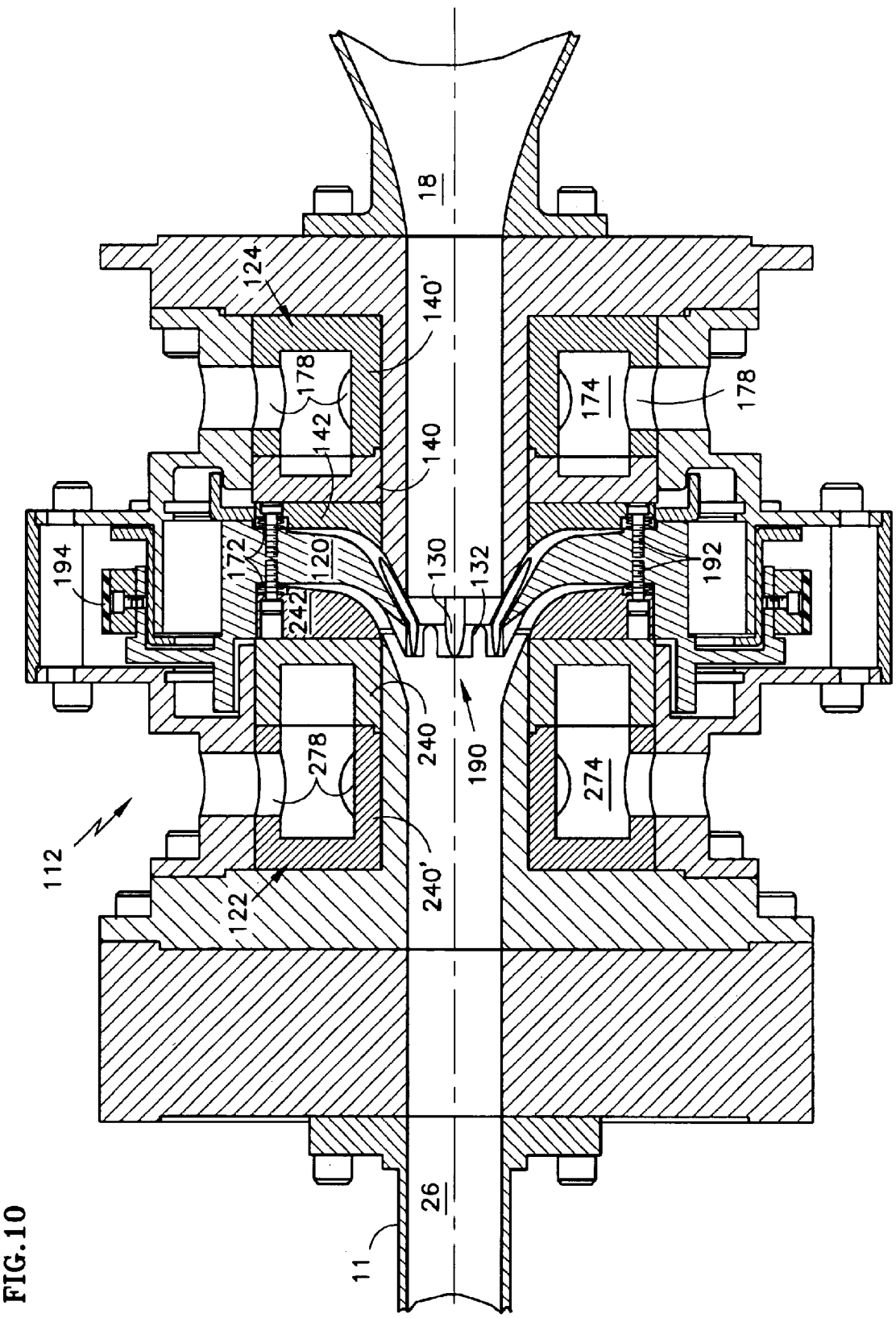
FIG. 10 is a simplified sectional view of a second embodiment of a pair of slotted-disk pulse valves for metering and injecting propellant and oxidant fluids to the PDE chamber to provide the aerovalve in accordance with the invention.
Figure 11:
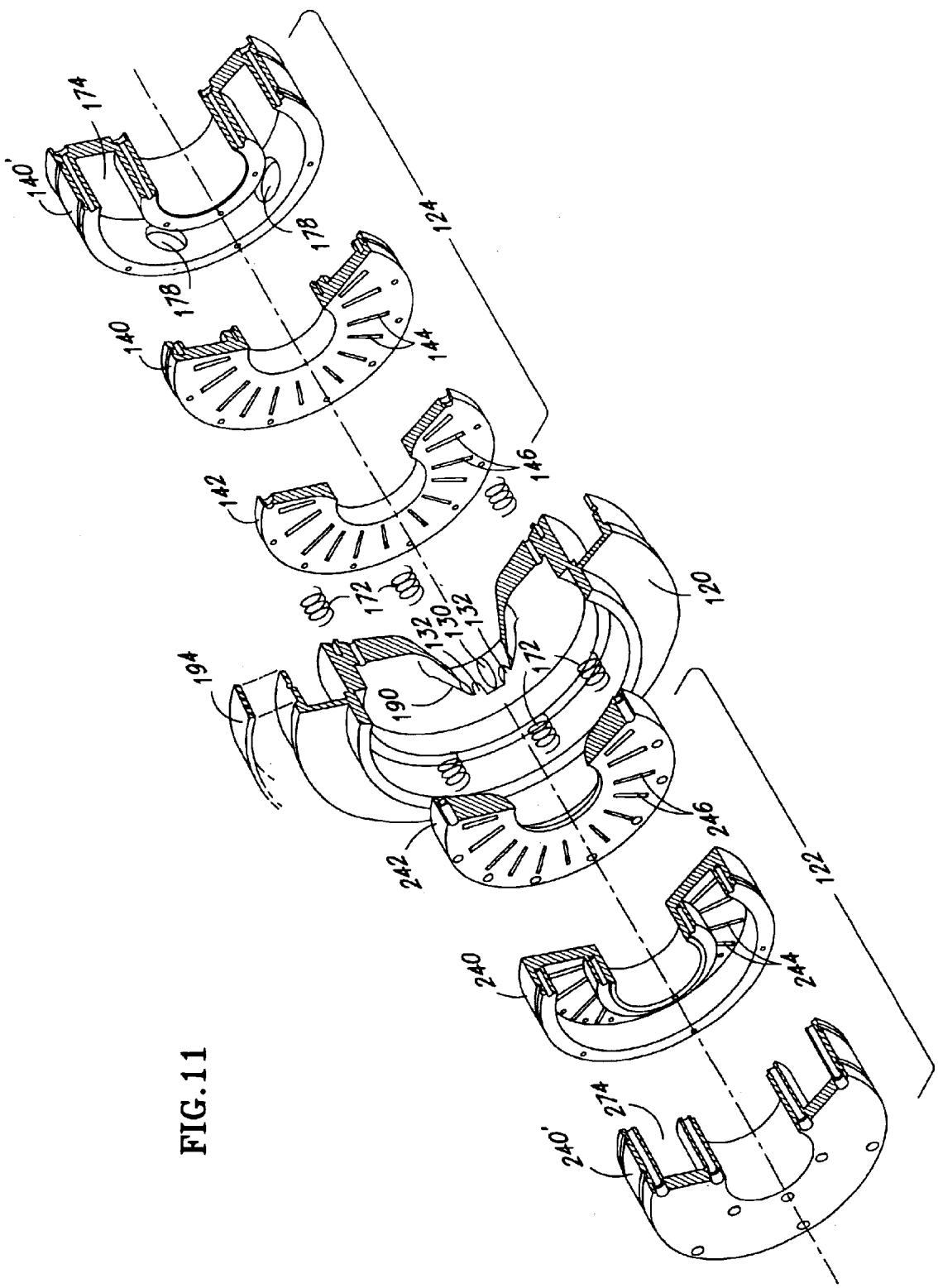
FIG. 11 is an exploded view of the major elements of the slotted-disk pulse valve assembly of FIG. 10.

Referring now to FIGS. 10 and 11, there is depicted a second embodiment of a fluid injection mechanism 112 comprising a pair of annular injection valves 122 and 124 that serve to inject pulses of the oxidant and the fuel, respectively. Unlike the injection valve arrangement 24 of FIG. 8 wherein the axis(es) of the fixed disk(s) 40 and the rotating disk(s) 42 are offset from the axis of the detonation chamber 26 of the PDE 10, the present fluid injection mechanism 112 provides a ganged pair of annular injection valves 122 and 124 having fixed annular disks 240 and 140 respectively, and rotating annular disks 242 and 142 respectively, all of which are concentric and coaxial with the axis of detonation chamber 26. The fixed disks 240 and 140 have radial slots 244 and 144 respectively, and the rotating disks 242 and 142 have radial slots 246 and 146, respectively. The injection valves 122 and 124 are axially spaced by a common annular injector member 120 that is positioned therebetween adjacent to the respective rotating disks 242 and 142. The annular injector member 120 has a lobed mixing tang 190 that defines, in cooperation with the rotating disks 142 and 242 and their slots 146 and 246, the fuel injection ducts 130 and the oxidant injection ducts 132 that extend radially inward and axially forward from the disks at the desired injection angle, β. The annular injector member 120, and the rotating disks 142 and 242 are all mounted for rotation coaxially about the detonation chamber 26, with at least part the injector member 120 defining an annular portion of the wall of the detonation chamber. The rotating disks 142 and 242 are connected to the annular injector member 120, as by a key, pin, or spline-type coupling arrangement 192 that allows limited relative axial motion but prevents relative circumferential motion, such that the three elements rotate in unison but some limited axial angular or "wobble" motion therebetween is permitted to allow each rotating disk to "float" relative to its associated fixed disk.

The fixed disks 240 and 140 are each further mated with fixed, plenum-forming members 240' and 140', respectively, to define plenums 274 and 174, respectively, and include fluid inlet passages 278 and 178, respectively, for supplying the oxidant and fuel. As with the FIGS. 8, 9a, and 9B embodiment, the faying surfaces of the fixed and the rotating disks are in sliding contact with one another and thus, are machined and processed to a fine finish and receive lubricants, such as a dry film and grease, to facilitate operation. To assure that the flat mating faying surfaces of the rotating and fixed disks come together and mate without any angular mismatch in the axial direction to insure good running and sealing, the rotating disks 142 and 242 are permitted to float a small amount relative to the respective fixed disks 140 and 240. Mote specifically, as noted above, the coupling arrangement 192 allows the rotating disks 142 and 242 to move axially angularly, or "wobble", relative to the annular injector member 120 that is positioned therebetween. A number of compression springs 172 are interposed and arranged circumferentially, under preload, between the injector member 120 and the outer rims of the respective rotating disks to resiliently bias the rotating disks 142 and 242 into close mating and sealing contact with the respective faying surfaces of the fixed disks 140 and 240.

In operation, the annular injector member 120 and the associated rotating disks 142 and 242 are rotated, as by a motor driven friction belt 194 or geared drive (not shown) engaging the injector member 120, and the slots 144, 244 146 and 246 port and unport as earlier described. Assuming about 20 slots on the disks, pulses of fuel and oxidant are provided at 100 Hz when the rotating portion of the fluid injection mechanism 112 is driven at 300 rpm.

Although the invention has been described and illustrated with respect to the exemplary embodiments thereof, it should be.understood by those skilled in the art that the foregoing and various other changes, omissions and additions may be made without departing from the spirit and scope of the invention. For instance, the fluid propellants injected may each be in either the liquid or gaseous phase; the pressure of the propellants in the detonation chamber at the moment of detonation may be less than, but nearly as great as, the pressure of the propellant as injected; the fluid injection mechanism for the pulse detonation engine may employ suitable fluid pulse injection arrangements other than the slotted disks of the preferred embodiment; and the use of PDE's is not limited to aeronautical and space applications, but may be used for power generation in other applications, including land-based machinery, either linear or rotary.

What is claimed is:

1. A fluid injection mechanism (12; 12'; 112) including at least one pulse valve (24; 124, 122) for providing high frequency pulses of a fluid medium, comprising:

a housing (50; 140, 140'; 240, 240') containing a plenum chamber (74, 174, 274);

means (76, 78, 178, 278) for supplying the fluid medium under pressure to the plenum chamber (74, 174, 274);

a pair of members (40, 42; 140, 142; 240, 242) mutually juxtaposed in close, facing relation and having respective slots (44, 46; 144, 146; 244, 246) therein, one member (42; 142; 242; 40; 140; 240) of the pair of slotted members (40, 42; 140, 142; 240, 242) being mounted to allow limited axial displacement relative to the other, one member (42, 142, 242) of the pair of slotted members (40, 42; 140, 142; 240, 242) being adapted to rotate relative to the other (40, 140, 240) to successively align and unalign, and thus port and unport, the slots (44, 46; 144, 146; 244, 246) in the two members, the pair of members (40, 42; 140, 142; 240, 242) defining a boundry of the plenum (74, 174, 274);

means (72; 172) for urging the one member (42; 142; 242; 40; 140; 240) of the pair of slotted members (40, 42; 140, 142; 240, 242) capable of said limited axial displacement into close sealing relation with the other member of the pair; and means (70, 54, 52; 194) for rotatingly driving one member (42, 142, 242) of the pair relative to the other (40, 140, 240) at a predetermined speed sufficient, in combination with the slots (44, 46; 144, 146; 244, 246) in the pair of members (40, 42; 140, 142; 240, 242), to provide successive pulses of the fluid medium at a high frequency.

2. The fluid injection mechanism of claim 1 wherein said means (72; 172) for urging the one member (42; 142; 242; 40; 140; 240) of the pair of slotted members (40, 42; 140, 142; 240, 242) capable of said limited axial displacement into close sealing relation with the other member of the pair comprise spring means (72; 172).

3. The fluid injection mechanism (12; 12') of claim 2 wherein the pair of slotted members (40, 42) comprise a stationary member (40) fixedly mounted in the housing (50) and a disk (42) rotatably mounted in the housing (50) adjacent to and upstream of the stationary member (40) relative to the direction of the supply of the fluid medium to the plenum chamber (74), the rotatable disk (42) being mounted to allow said limited axial displacement whereby the pressure of the fluid medium also urges the rotatable disk (42) into close sealing relation with the stationary member (40).

4. The fluid injection mechanism of claim 3 wherein the rotatable disk (42) includes an axially located, shaped seating recess (71'), and the means (70, 54, 52) for rotatingly driving the disk (42) comprise a rotary motor (52), a drive shaft (54) connected to the motor (52) and a shaped driver (70), the drive shaft (54) including a shaped recess (68) extending axially in its distal end, the proximal end of the shaped driver (70) being slidably disposed in the shaped recess (68) of the drive shaft (54) and shaped to prevent rotation relative to the drive shaft (54), the distal end of the shaped driver (70) including a shaped head (71), the shaped head (71) and the shaped seating recess of the rotatable disk (42) being cooperatively shaped for mated rotary driving engagement and limited floating axial and wobble displacement of the rotatable disk (42), and wherein the spring means (72) comprise a compression spring disposed in the shaped recess (68) of the drive shaft (54) and acting on the shaped driver to bias its shaped head (71) into the shaped seating recess of the rotatable disk (42).

5. The fluid injection mechanism of claim 2 wherein the fluid medium is a gaseous propellant for a pulse detonation engine (10), the opposed facing surfaces of the fixed member (40) and the rotatable disk (42) are ground to precision flatness and finish to provide respective faying surfaces, and the number of slots (44 or 46) in at least one of the fixed member (40) and the rotatable disk (42) is at least about ten.

6. The fluid injection mechanism of claim 1 wherein the frequency of the successive pulses of the fluid medium provided by the at least one pulse valve (24; 124, 122) approaches or exceeds 100 Hz.

7. The fluid injection mechanism (112) of claim 1 wherein there is included a pair of annular pulse injection valves (124, 122) for respectively providing high frequency pulses of respective different fluid media to a pulse detonation engine (10), the housing (140, 140'; 240, 240') containing a pair of respective annular plenum chambers (174, 274) disposed coaxially with the pulse detonation engine (10); the respective different fluid media being supplied to the respective plenum chambers (174, 274) via the respective supply means (178, 278); there being two pairs of annular members (140, 142; 240, 242), with the annular members of a respective pair being mutually juxtaposed in close, facing relation and having respective slots (144, 146; 244, 246) therein, one member (140, 142; 240, 242) of each pair of slotted members (140, 142; 240, 242) being mounted to allow limited axial displacement relative to the other of that pair, one member (142, 242) of each pair of slotted members (140, 142; 240, 242) being adapted to rotate relative to the other member (140, 240) of that pair to successively align and unalign, and thus port and unport, the slots (144, 146; 244, 246) in the two members of that pair, each pair of slotted members (140, 142; 240, 242) defining a boundry of the respective plenum (174, 274); each pair of slotted members (140, 142; 240, 242) having a respective means (172) for urging the one slotted member (142; 242; 140; 240) of each pair of slotted members (140, 142; 240, 242) capable of said limited axial displacement into close sealing relation with the other slotted member of that pair; and the means (194) for rotatingly driving one slotted member (142, 242) of each pair relative to the other slotted member (140, 240) of that pair at a predetermined speed is operative to drive that respective one slotted member (142, 242) of each of the two pairs (140, 142; 240, 242) in unison.

8. The fluid injection mechanism (112) of claim 7 wherein the pair of annular pulse injection valves (124, 122) are ganged in axially-spaced relation by an annular injector member (120) intermediate and common to the pair of valves.

9. The fluid injection mechanism (112) of claim 8 wherein the annular injection member includes a lobed mixing tang (190) to assist in directing fluid pulse flow.

* * * * *